Aug. 12, 1969   L. J. LAZARIDIS   3,460,524
THERMIONIC POWER AND HEAT SOURCE
Filed Aug. 2, 1967   4 Sheets-Sheet 1

INVENTOR.
LAZAROS J. LAZARIDIS
BY
ATTORNEYS

Aug. 12, 1969　　　L. J. LAZARIDIS　　　3,460,524
THERMIONIC POWER AND HEAT SOURCE
Filed Aug. 2, 1967　　　　　　　　　　　　4 Sheets-Sheet 2

INVENTOR.
LAZAROS J. LAZARIDIS
BY
ATTORNEYS

Aug. 12, 1969  L. J. LAZARIDIS  3,460,524
THERMIONIC POWER AND HEAT SOURCE
Filed Aug. 2, 1967  4 Sheets-Sheet 3

INVENTOR.
LAZAROS J. LAZARIDIS
BY
ATTORNEYS

United States Patent Office 3,460,524
Patented Aug. 12, 1969

---

3,460,524
THERMIONIC POWER AND HEAT SOURCE
Lazaros J. Lazaridis, Canton, Mass., assignor to Thermo Electron Corporation, Waltham, Mass., a corporation of Delaware
Filed Aug. 2, 1967, Ser. No. 657,876
Int. Cl. F24h 3/04; F28d 15/00; H02n 3/00
U.S. Cl. 126—110
10 Claims

ABSTRACT OF THE DISCLOSURE

A power supply system which includes a thermionic device for converting heat into electricity combined with energy storage units and switching circuitry to make available electrical power instantly, continuously and at a voltage level suitable for use with conventional electrical apparatus. One application of the system is related to domestic heating installations. Either integrated or used in conjunction with a conventional heating system is a power supply which includes a group of series-connected thermionic diodes. The emitters of the diodes are heated by the combustion of the same fuel used in the heating system. The thermionic diodes provide an electrical output which is applied to a given storage battery or batteries of a set, as determined by the charge level of the battery or batteries while another battery or batteries is available to provide power as required. Apparatus including voltage sensors and relays permits application of the output of the thermionic diodes to charge in parallel the cells of those batteries requiring charge. Simultaneously, the cells of a fully charged battery are connected in series to make available an output at a conventionally useful voltage level.

---

Local generation of electrical power making electrical equipment and appliances independent of an external power source, has a number of important advantages. Power losses, such as the recent one in several northeast States in the United States, have emphasized the desirability of on-site power generation. Also, of course, where the power requirements of mobile equipment are involved, permanent power connections are not possible, and independent power sources are essential.

This invention concerns a thermionic power supply which, using combustion of any fuel as a heat source, will provide necessary electrical power and utilization of "reject" heat. In view of the fact that many home furnaces in this country employ natural gas as fuel and forced air as the heat-circulating medium, this invention will be described as embodied in such heating systems. However, the same techniques are applicable to systems employing other sources of energy, for example, fuel oil; and other modes of heat transmission; for instance, hot water.

The basic component of the system is a thermionic converter which inherently is a low voltage, high current source of direct current. Such an output is unsuited for the conventional applications of power found in the home. Even in the heating system itself, driving fractional-horsepower D.C. motors, meeting the cyclic requirements of a furnace, and utilizing available components in connection with thermionic converters raise numerous problems.

The thermionic power supply system of the invention is intended to convert a portion of applied heat into the required electrical power for fans and controls of the furnace and for other purposes. However, a large amount of heat is rejected in the conversion process. It is obvious that such a waste of heat is uneconomic and, in known systems, unavoidable because of the characteristics of thermionic converters.

Therefore, among the several objects of the invention are: a gas-fired thermionic power supply unit in which a portion of the reject heat from conversion is used for building heating; a gas-fired thermionic power unit from which a direct current output is instantly and continuously available at all times without delay caused by thermal inertia; a power supply unit which includes means for charging one set of storage batteries while another set of fully charged batteries is available for use as a source of electrical power; switching circuitry for determining the batteries to be charged and the batteries to act as the source of electrical power; switching circuitry for placing the cells of one set of batteries in parallel for charging and the cells of the batteries of a second set in series to act as the source of electrical power; and the combination of a heating unit and a thermionic power unit in which the electrical output from the power unit serves at least to operate the motors and controls of the heating unit without waste of the reject heat from the conversion unit.

Other objects and advantages will be in part obvious and in part pointed out hereinafter.

A true appreciation of the invention as utilized in the average home requires some background data and general explanation. Heating such a home in the northeastern area of the United States requires a furnace of about 125,000 B.t.u./hr. input. In a common forced-air system, a quarter-horsepower motor drives the fan, and the various controls on the furnace may require about 20 watts of power. The total power requirements are thus about 210 watts.

If a thermionic diode is to be employed, it must be capable of providing an output of such magnitude, or more, if it is desired to accommodate additional electrical power-consuming devices. Also, that output must, in some fashion, be converted to a voltage level suitable for commercially available motors, appliances and the like.

Such an output is made available by providing two batteries or sets of batteries, referred to as simply batteries herein below for the sake of clarity. The emitter of the thermionic diode is heated to its required high temperature by a suitable burner of fuel and its output is connected to charge the first battery. Meanwhile, a second fully charged battery is available to serve as a source of electrical power. When the first battery is fully charged, a sensing circuit discontinues operation of the thermionic supply. The sensing circuit also serves to detect depletion of the second battery and, upon such depletion, the thermionic supply is again activated to commence charging the second battery while making available as a source of electrical power the now fully charged first battery.

In order that low-voltage high current charging may be used while relatively high-voltage consumption is accommodated, a switching system is employed to connect the cells of the battery being charged in parallel while the output of the power-supplying battery is taken with the cells in series. Even though charging takes place with the battery cells in parallel, the output voltage of a single thermionic diode may be too low in which case the needed voltage is produced by placing more of the diodes in series.

Because the thermionic diodes operate efficiently only at extremely high temperatures, much of the applied heat is "rejected" by the units. To avoid wasting the reject heat, an exhaust system is provided to utilize that heat as an aid to the furnace in its general building-heating function. For a better understanding of the present invention, its objects, features and advantages, reference should be made to the following detailed description of a preferred embodiment which should be read in conjunction with the attached drawing in which.

Figure 1:
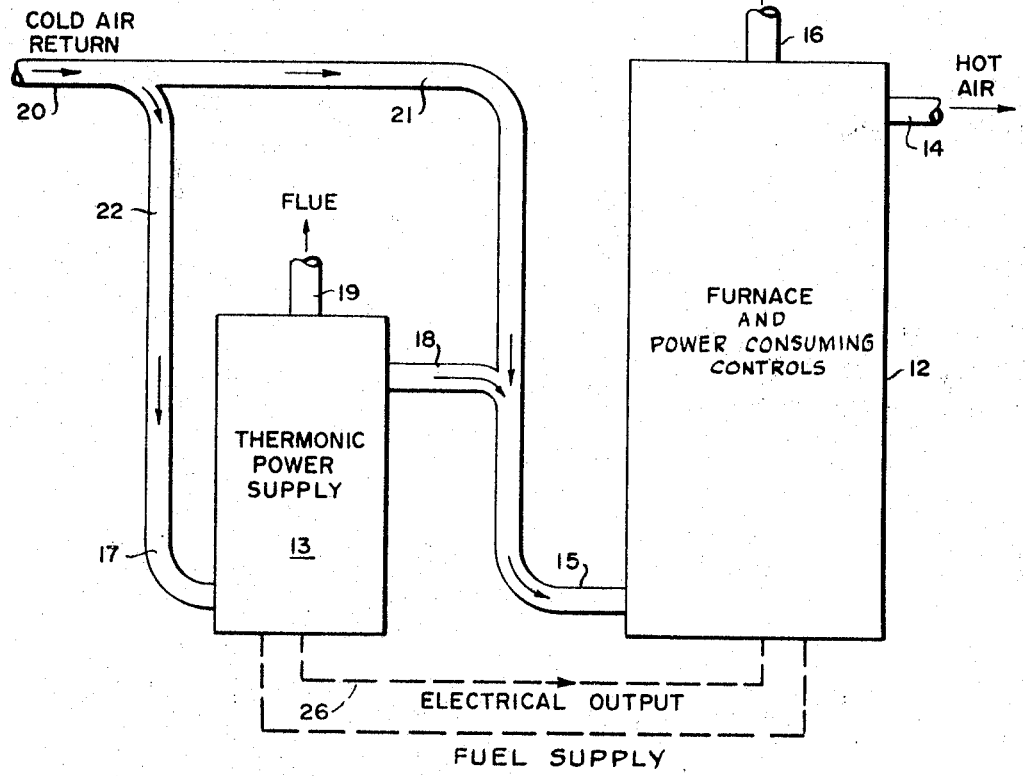
FIG. 1 is a block diagram of a power supply-furnace installation incorporating the invention.

Referring now to FIG. 1, there is shown a furnace 12 for supplying heat to a building or dwelling. The furnace 12 is coupled operatively to a thermionic power supply 13. In this instance, the furnace 12 is shown as a gas-fired hot air furnace having a conventional hot air outlet 14, return air inlet 15 and exhaust flue 16. The thermionic power supply 13, which will be described in detail below, has a cool air inlet 17 and an exhaust outlet 18. An exhaust flue 19 is provided for exhausting products of combustion from within the power supply. Conventional duct work is also shown and this includes a cold air return duct 20 from the dwelling having two branches, one branch 21 leading to the furnace return air inlet 15, and the other branch 22 leading to the power unit cool air inlet 17.

From this drawing it is seen that reject heat from the thermionic power supply 13 is fed into the cold air return inlet of the furnace 12. Heated air emerging from the power unit enters the furnace plenum chamber at a temperature of approximately 150° F. The heat content of this air supply is thus delivered into the air being circulated by the furnace throughout the building being heated.

Figure 2:
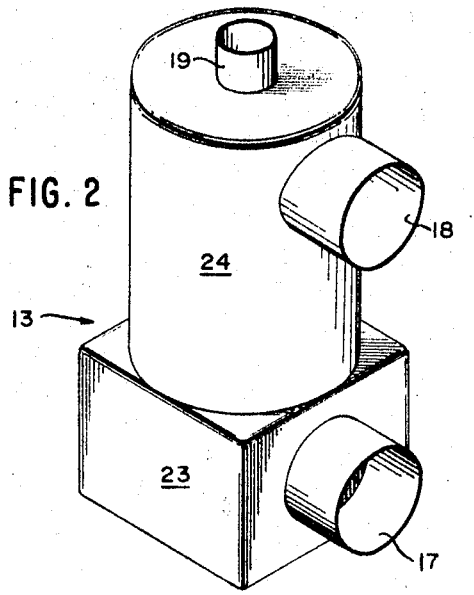
FIG. 2 is an outline in perspective of a thermionic unit.

In FIG. 2, there is illustrated an actual gas-fired thermionic power unit embodying this invention. It comprises a base 23 on which is mounted a shroud 24 which encloses the operative parts per se of the power unit. The cool air inlet 17 enters the base as shown, and serves to cool the batteries and other controls which are located in the base. The air then passes upwardly between the shroud 24 and the thermionic converter proper. Having circulated about the converter and extracted heat therefrom, it then emerges from the shroud via the outlet 18 and, as indicated above, is conveyed to the cold-air return 15 of the furnace, there to deliver its heat to the plenum chamber of the furnace.

Figure 3:
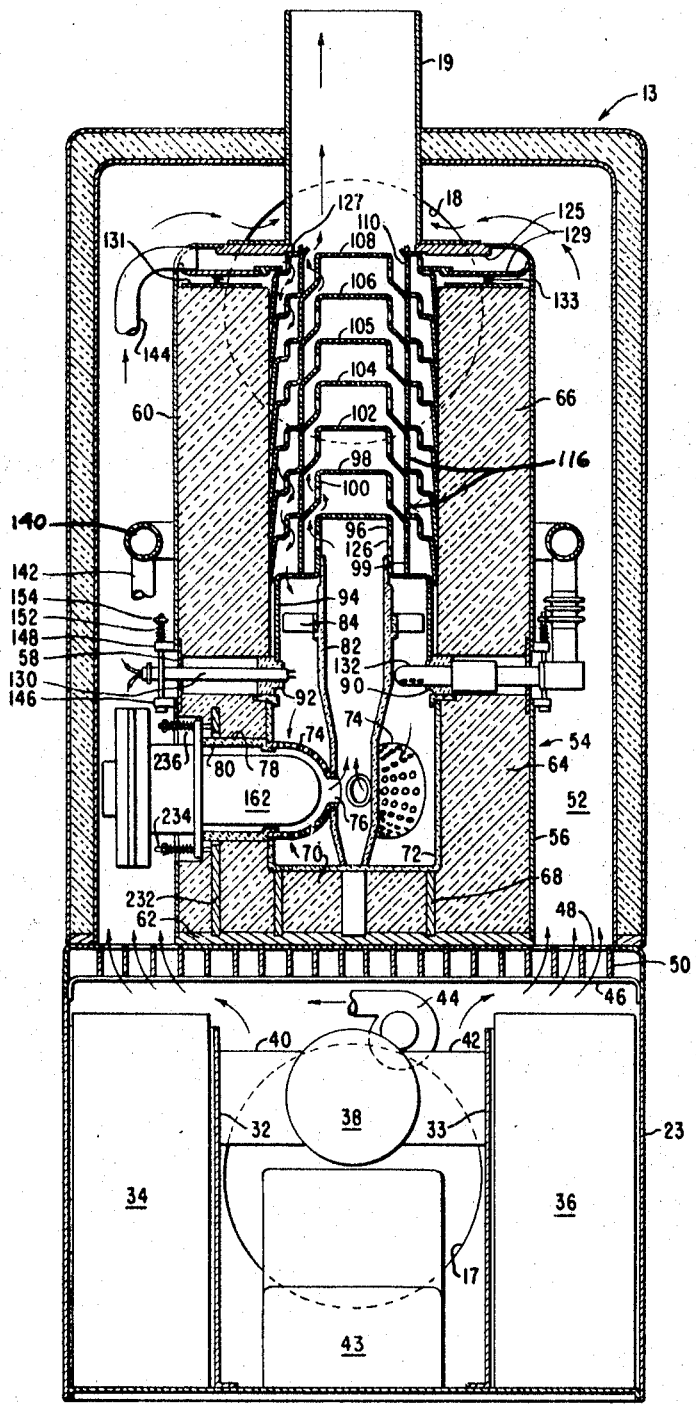
FIG. 3 is an elevation, partly cut-away and partly in outline of a thermionic unit including a heat exchanger.

Referring now to FIG. 3, a vertical section of the thermionic power supply unit 13 is shown. The base 23, which may be made of metal, is in the form of a box having a pair of compartments 32 and 33 each of which is adapted to hold a set of batteries 34 and 36. Mounted in the base 23 and schematically shown are the operating controls for the power unit, including a relay 38, switches 40 and 42, and a spark ignition device 43. The physical form of these controls and their location in the base 23 is not part of this invention, and thus these controls have been shown only schematically.

Also mounted in the base 23 is a combustion-air supply fan 44, the purpose of which is to furnish air for the combustion chamber of the apparatus. The fan 44, which is preferably of the impeller type, is mounted in the base in order that its air intake may conveniently be connected to the inlet 17.

Beneath the junction of the shroud 24 and the top 48 of the base 23 is a perforated partition 46. A plurality of insulating spacers 50 separate the top of the base from the partition 46. In the junction area, the top of the base is also perforated and air from within the base is channeled into the space 52 between the shroud 30 and the thermionic energy converter proper which is indicated generally by the reference numeral 54.

The thermionic power supply 54 is in the form of a hollow elongated tubular assembly having an outside sheath composed of three concentric cylinders 56, 58 and 60. The material of the cylinders 56–60 may be, for example, low carbon steel. The members 56 and 60 have the same diameter, and the member 58 fits closely within the members 56 and 60. Vertical movement of the cylinder 60 with respect to the member 56 is thus made possible. The member 56 is mounted on a heat-resistive and insulating base 62 which rests on, and is attached to, the top 48 approximately centrally thereof. Lining the sheath member 56 is a quantity of insulating material 64 such as, for example, rock wool or other like material resistant to high temperatures. A similar material 66 lines the sheath member 60 and is likewise of high temperature resistant heat insulating material. The forms 64 and 66 have approximately the same diameter and are axially aligned. Also mounted on the base 62 is a supporting ring 68, this ring being made of heat resistant and insulating material. Additional high temperature resistant insulating material 70 is provided within the supporting ring 68.

Within the interior of form 64 is a generally cup-shaped combustion chamber or pot 72, this being mounted upon the supporting ring 68. The pot 72 is made of formed silicon carbide and its wall is pierced at three locations equidistant around its periphery. Within the holes thus provided are cemented heating cups 74 also of silicon carbide, these cups having perforations 160 (see FIG. 6) and being generally hemispherical in shape. Each heating cup has an opening and neck 76 at its pole.

Holes 78 co-radial with the holes in pot 72 are formed through the insulating material 64 and the sheath 56 in which are mounted semi-spherical heating cups 74. A supporting sleeve 80 fits into each of the holes 78, these supporting sleeves and the heating cups 74 providing sockets for receiving thermionic diodes which will be described below.

Supported on the bottom of the hearth member of pot 72 is a combustion throat member 82, the lower portion of which is pierced with three holes to receive the necks 76 of the heating cups 74. The member 82 is made of formed silicon carbide, and the necks 76 are cemented therein. The member 82 is provided with a suitable flange on the upper portion of its exterior, which supports an air distributing member 84, the function of which is to impart to incoming combustion air a swirling or rotary action.

Figure 4:
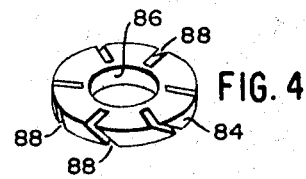
FIG. 4 is a perspective view of a gas swirler.

The member 84 may be seen in FIG. 4 to be toroidal in shape, the central bore 86 fitting on the exterior of the exhaust throat member 82. A series of slots 88 are provided in the toroidal member 84, these slots extending diagonally from one face of the torus to the other.

Mounted on top of the upper end of the hearth 72 is a flange 90, this also being of silicon carbide. A torus 92 is positioned on the top of flange 90, this torus being made of silicon carbide. The upper surface of torus or ring 92 is rabbeted as shown, and receives the lower end of the first unit 94 of a compound heat exchanger unit similar in most respects to that disclosed in co-pending application Ser. No. 446,476 entitled "Heat Exchangers," now Patent No. 3,416,011, granted Dec. 10, 1968 and assigned to the assignee of this application. The unit 94 is made of silicon carbide and terminates in an upper end portion 96 of reduced diameter which has an inner diameter matching the outer diameter of the uppermost end of the exhaust throat member 82 over which it is closely fitted.

Figure 5:
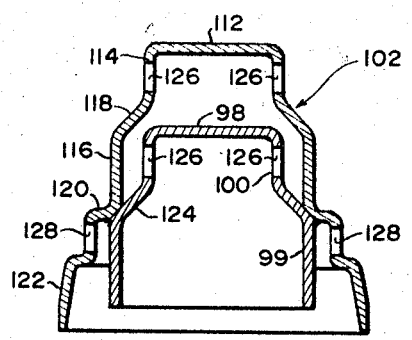
FIG. 5 is a schematic sectional view of a section of a heat exchanger.

Mounted on the unit 94 is the second member 98 of the heat exchanger, this being an inverted pot-like member as illustrated, and having a lower portion 99 (as viewed) which is larger in diameter than the upper neck portion 96 of the first heat exchanger unit, and a neck portion 100 of approximately the same diameter as neck portion 96. The portions 99 and 100 are joined by a slanting wall portion as shown. Additional members 102, 104, 106 and 108 of the heat exchanger unit are all similar, and one of these will be described. Such a member is unit 102 (see FIG. 5) the unit being generally pot-shaped and having three steps of different diameters to form three separate sections. The upper section is closed by a top 112 from which a vertical cylindrical wall 114 depends. The diameter of the wall 114 is the same as the diameter of the neck portion 100 of unit 98. The wall 114 of the upper section is flared outwardly and downwardly at 118 to join the middle vertical cylindrical section wall 116. The lower end of the wall 116 is turned at right angles to form the horizontal flange 120. Depending from the flange 120 is another vertical cylindrical wall 128, the lower edge of which is turned first outwardly and then downwardly to form the flare 122 which engages the inner surface of the insulation 66. The unit 100 provides basic support by reason of the nesting of the unit 102 upon the unit 100 and the sealing of the inside wall of the flange 120 to the flare 126 of the unit 100.

As is plain in FIG. 3, the vertical cylindrical wall 116 of the unit 102 is a single element of what becomes a continuous heat-exchanging wall. Products of combustion circulate sinusoidally to impinge repetitively upon one side of the heat-exchanging wall and incoming combustion air similarly circulates to impinge repetitively upon the other side of the heat-exchanging wall. This is made possible by the openings formed about the peripheries of the various heat exchanger units. Holes such as the typical hole 126 are formed in the neck portions of each of the heat exchanger units, and holes such as the hole 128 are formed in the vertical cylindrical walls of largest diameter in the heat exchanger. As indicated by the arrows in FIG. 3, incoming air passes through the holes 128 to impinge on the outer surface of the heat-exchanging wall constituted by the elements 116 repetitively as it follows a sinusoidal path. The jetting action and its removal of stagnant layers for more efficient heat transfer is described in the above-cited co-pending application Ser. No. 446,476. The incoming air thus pre-heated ultimately reaches the combustion chamber. Similarly, the products of combustion follow a sinusoidal path through the holes 126 in the necks of the heat-exchanging units repetitively jetting upon the inner surface of the heat-transfer wall constituted by the elements 116. The two sinusoidal paths for the inward flow of combustion air and the outward flow of exhaust products with the multiple jetting action result in a highly efficient transfer of heat to the incoming air from the products of combustion.

The top heat exchanger unit 110 is open-ended to permit the products of combustion to escape freely into the exhaust flue 19.

The top of the sheath 60 curves inwardly and forms an opening into which is fitted a circular plate 125 made of metal. In the plate 125 there is an opening 127 which surrounds and rests on the top heat exchanger unit 110. A partition 129 extends across the upper end of the member 60 to form with the plate 125 an input manifold for the introduction of input air.

A flat pressure plate 131 is forced against the upper surface of the insulating material 66 by compression springs 133, the function of which is to prevent the insulation 66 from riding upwardly with cylinder 60 as the latter expands with heat.

Returning now to the construction of the power unit, it has already been stated that the ring or cylinder 58 is telescopically in engagement with the upper and lower sections of the cylinder sheaths 56 and 58. A plurality of holes is formed in the wall of the cylinder 58, and through one of these an ignition element 130 is passed. Its function is to initiate combustion by a spark discharge. Through other holes in the ring 58 and between insulation forms 64 and 66 a plurality of fuel supply nozzles pass and a typical nozzle 132 is shown in FIG. 3. The inner ends of the nozzles project through the supporting torus 92. The outer ends of the nozzles are connected in the same manner as the nozzle 132 to a gas supply manifold. The nozzle 132 is typically connected through a line 134 which includes an expansion section 136 to the manifold 140. The manifold 140 is supplied from a pipe 142 which extends down into the base 23, at which point the pipe 142 may be connected to a suitable gas supply, such as the one supplying the furnace.

The combustion air is supplied to the input manifold by an inlet pipe 144. The fan 44 drives the air through the pipe 144, the interconnection not being shown to avoid unduly complicating the drawing. It has proven beneficial to mix air with gas being supplied to the manifold 140 by means of a branch tube from the pipe 144. Details are not shown for purposes of clarity.

Lugs 146 are welded at a number of points to the top of sheath 56 and similar lugs 148 are welded to the bottom edge of sheath 60 in alignment with the lugs 146. Each matching pair of lugs is resiliently joined by a bolt similar to the bolt 150 on the threaded end of which a spring 152 is compressed by a wing nut 154. By this means, the entire upper insulated sheathing section of the converter unit proper is resiliently attached to the bottom section. Upon expansion or contraction of elements due to temperature changes, the upper section of the converter may move vertically by virtue of the telescopic engagement of the sheaths 56, 58 and 60. Undue stresses on the elements, particularly on the silicon carbide units of the heat exchanger, are thus avoided. When the burner is not operating, gravity, aided by the springs 152, will draw the upward section downwardly into its cold rest position. The several enclosed parts are thereby kept in alignment, and the nesting of the heat exchanger units is not disrupted.

Figure 6:
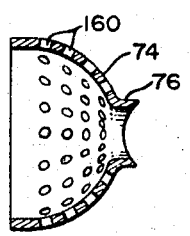
FIG. 6 is a fragmentary view of a heat-cup for enclosing a thermionic diode.

Referring now to FIG. 6, there is shown in enlarged section one of the heating cups 74 in order to illustrate details. As indicated above, the heating cup 74 is generally hemispherical in shape, and terminates in a neck 76. The heat cups are made of silicon carbide in order to withstand the high temperature of the combustion chamber, into which they project. Each heating cup is perforated to form a series of orifices 160, the function of which is to permit the products of combustion to come in contact with the outer surfaces of the diode emitters as explained below. The orifices 160 serve the further function of jetting the combustion gases at high velocity upon the emitter surfaces to penetrate or disrupt any boundary layers of gases that may exist on those surfaces.

Figure 7:
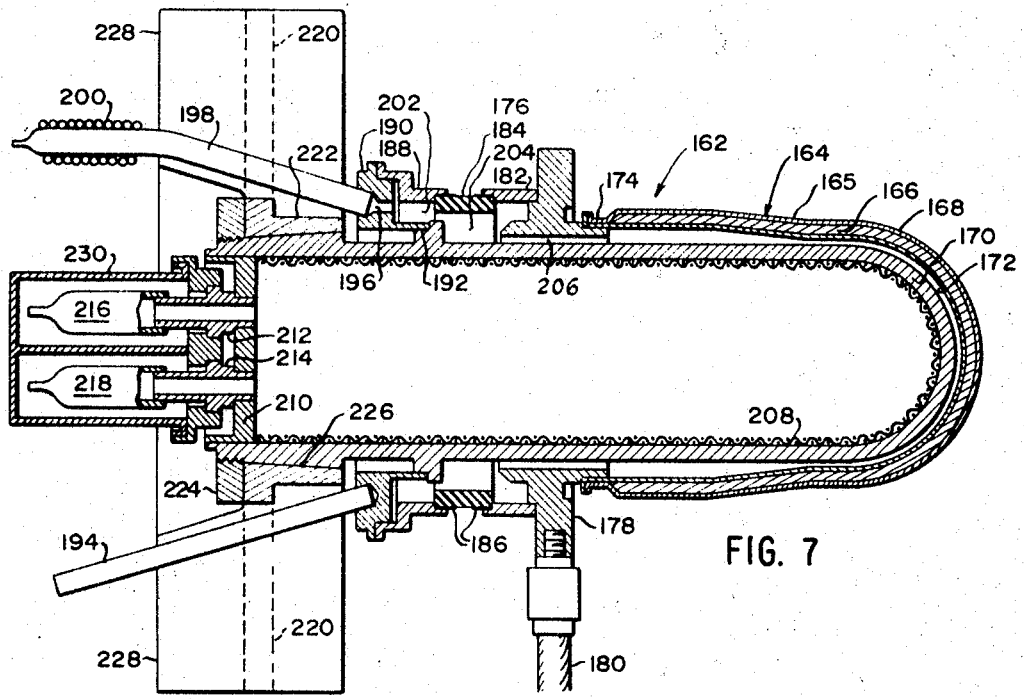
FIG. 7 is a view in section of a thermionic diode.

Referring now to FIG. 7, there is shown a cross-section of a diode which may be any one of several known types such as that disclosed in U.S. Patent No. 3,054,914. The basic components of a thermionic diode are an emitter and a collector. In the diode 162 shown in FIG. 7, the emitter 164 is composed of outer layer 165 of pyrolytic silicon carbide, capable of withstanding exposure to extremely high temperatures, an inner layer 168 of tungsten to provide electrons and a central carbon layer 166 to bond together the silicon carbide and the tungsten layers. The carbon layer also acts as a barrier against unwanted chemical interaction between tungsten and silicon carbide which may occur at elevated temperatures. The collector 170 of the diode is made of nickel or stainless steel. The adjacent surfaces of the emitter and the collector 170 are spaced apart about 0.010 inch when operating temperatures have been reached. The emitter 164 is tubular with a hemispherical end, and the inner and outer layers are brought together at a rim 174 to enclose the interior carbon layer. Inserted into the rim 174 is an extension of a molybdenum collar 176 having on one surface a shoulder to which the rim 174 is brazed. A connecting stud 178 on the collar 176 permits electrical connection to be made by a heavy braided copper lead 180. Brazed to a shoulder on the other surface of the collar 176 is a short sleeve 182 made of nickel-iron alloy, which acts as a standoff and connecting link. A ceramic heat-resistant insulating collar 184 is fitted to a shoulder on the collar 182 and brazed in place by means of a metallic overlay 186. The other rim of the collar is similarly provided with a metallic overlay and to this is brazed a nickel-iron alloy, flanged collar 188. A flanged ring 190, likewise made of nickel-iron alloy, is welded or brazed into the collar 188, collar 190 being fitted upon and welded or brazed to a shoulder 192 on the collector 170. An electrical connector 194, which may be solid copper or a heavy braided copper lead, is brazed into the collar 190 as shown. An opening 196 is formed through the collar 190 and a copper tube 198 is inserted in the opening and brazed in place. A small quantity of metallic cesium is placed in the tube 198 and its outer end is sealed closed. A heating coil 200 surrounds the end of the copper tube for purposes explained below.

A series of passageways 202, 204 and 206 lead from the tube 198 into the space between the emitter and the collector. The heating coil 200 is used to melt and vaporize the cesium in the tube. The cesium passes into the space between the emitter and collector to enhance the transfer of electrons from the heated emitter surface 168 to the collector surface 170 by minimizing the effects of any space charge.

Within the enclosure of the collector 170, and adjacent its wall, there is provided a screen of wire mesh 208 preferably made of nickel or stainless steel. The end of the collector body is closed by the plug member 210 in which are provided a pair of orifices into which are brazed the tubes 212 and 214. Attached to each of these tubes are larger copper tubes 216 and 218, respectively, which are shown as sealed off. Prior to sealing off the tubes 216 and 218, about 10 grams of metallic potassium are distilled into the interior of the collector 170. The function of the potassium and the mesh 208 which lines the interior of the collector is to form a heat pipe to transfer heat from the collector surface to a finned structure (described below) from which the heat rejected by the collector can be dissipated by convection.

The heat pipe depends for its operation upon the latent heats of evaporation and condensation of potassium. Briefly stated, the potassium will condense in the unheated end portions at the left of the collector because of their lower temperature, the heat of condensation being given up to the cooling fins. The condensed potassium is then drawn by capillary action along the interspaces between the mesh 208 and the surface of the collector 170. As it does it moves toward the hotter right end of the collector. At a point adjacent the heated right end, the potassium vaporizes and the heat of evaporation is withdrawn from the collector. Due to convection currents, the vaporized potassium moves toward the cooler left end of the collector until it reaches the point at which it again condenses, delivering its heat of condensation to the cooling fins.

By use of the heat pipe, considerable weight reduction can be made in the converter or diode itself, by eliminating the need for a solid collector structure to conduct heat to the heat dissipation fins. Additional weight reduction results from the extremely low temperature drop along the collector's length, which leads to higher fin temperatures, and consequently smaller areas necessary for the heat dissipation surfaces.

Figure 8:
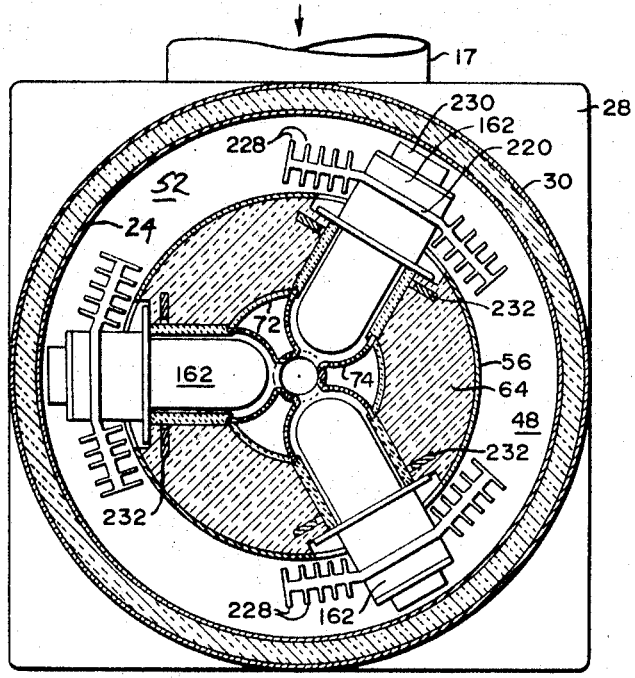
FIG. 8 is a cross-section of the appaartus of FIG. 3.

The finned structures for heat dissipation are illustrated in FIGS. 7 and 8, the latter being a cross-section of the converter unit as a whole. Referring to FIG. 8, three of the above-described diodes 162 are shown. A copper or aluminum bar 220 is provided at the end of each diode, the bar having a tapered collar 222 which fits around a similarly tapered end of the collector. A clamp nut 224 is threaded onto a threaded portion of the end of the collector 170 in order to clamp the collar thereto. Attached to the bar 220 by conventional means such as brazing, is a series of heat radiating fins 228, these fins and the bar 220 itself being so formed and arranged that the fins extend longitudinally in the space 52 between the shroud 24 and the casing 56. The bar itself is bent so that it and the fins follow the contour of space 52, as shown in FIG. 8. A sealing cap 230 may be provided at the end of the collector, if desired, to protect the pinched-off filling tubes 216 and 218.

Each of the diodes is supported in one of the enclosures formed by a heat shield similar to the heat shield 74. As in the case of the diode shown in FIG. 3, a supporting bracket 232 is mounted on the base 62 and carries mounting bolts 234. The collars 176 on each diode are provided with mating holes through which the bolts 234 project. The ends of the bolts carry mounting springs held against the back surface of the collars 176 by nuts to hold the diodes in position.

Figure 9:
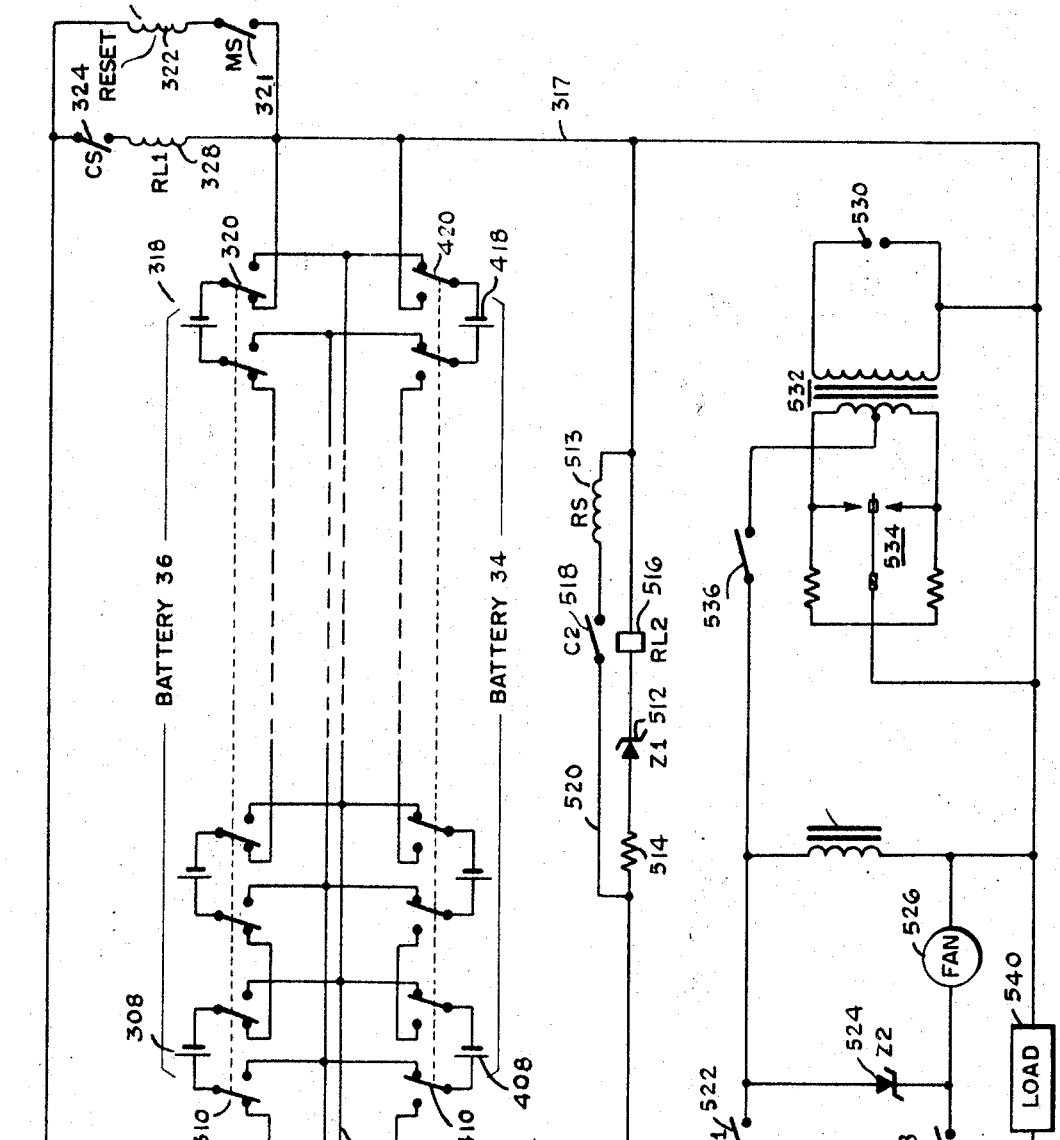
FIG. 9 is a circuit diagram of the switching and energy-storage means and the controls for a thermionic power supply.

It has been earlier indicated that one of the features of the invention is the provision of instantly available D.C. power from batteries, and that the batteries are arranged in two sets so that while one set is delivering its power the other set is being charged, as needed, by the diodes. The arrangement of the batteries, relays for making such connections and the diodes is shown in FIG. 9.

The battery 34 is assumed to be fully charged from three thermionic diodes 162. Three diodes are placed in series to obtain the requisite 1.5 volts needed to charge the cells of a nickel-cadmium battery. With other types of batteries, the number of diodes placed in series would, of course, be selected to provide the proper charging voltage. The charging current passes through the lines 302 and 304, and a fuse 306 is incorporated in the line 302 as a protection against overload such as might be encouraged from an internal short circuit in the battery.

For illustrative purposes, the battery 34 is shown as being composed of some ten or more cells, all of which are connected for charging in parallel by means of a bank of cam-operated double pole-double throw switches, the cell 408 and the switch 410 being typical of the plurality of cells 408–418 and switches 410–420.

If it be further assumed that the battery 36 is approaching a selected point of depletion, for example, 11 volts, a Zener diode 512 is connected to a cell 308 of the battery 36 through an associated double pole-double throw switch 310, the cell 308 and the switch 310 being typical of the cells 308–318 and cam-operated switches 310–320 associated with the battery 36. The batteries 34 and 36 are, of course, identical as are the various switch elements. The elements are ganged, and mechanical drive for the elements is provided by a rotary solenoid 513. Suitable gearing which may be clutch-driven from the solenoid 513 is provided.

Reverting to the electrical operation, per se, however, the Zener diode 512, by reason of its connection to the positive side of the cell 308 through a limiting resistor 514 and its further connection to the negative side of the similar cell 318 through one of the switches 320 and through a relay coil 516 is normally carrying current sufficient to energize the relay coil 516 and maintain its contacts 518 open. With the drop in voltage of the battery 36, conduction through the Zener diode 512 ceases and the relay coil 516 is no longer energized causing the contacts 518 to close.

Closing of the contacts 518 actuates the rotary solenoid 513 from the battery 36 through a line 520 which bypasses the Zener diode 512, the resistor 514 and the relay coil 516. The rotary solenoid then drives the ganged switches to reverse switch conditions, not only in the switches 410–420 associated with the battery 34, but also in the similar group of switches 310–320 associated with the battery 36. By the action of the rotary solenoid, the cells of the battery 36 are now connected in parallel through bus lines 312 and 314 to the lines 302 and 304 for charging and the cells of the battery 34 are placed in series between lines 316 and 317. Also, switch contacts 321 are momentarily closed by the action of the rotary solenoid 513 to energize the coil 322 of a reset relay. Energization of the coil 322 opens the contacts 324 of a special latching relay which is controlled by a sensing relay 326, the function of which is explained in detail below. When the contacts 324 are opened, a relay coil 328 is de-energized to close contacts 522 into their normally closed position.

Closing of the contacts 522 applies voltage through a semiconductor diode 524 to a combustion air fan motor 526, and directly to a solenoid gas valve 528 to allow gas into the combustion chamber of the thermionic diodes. A spark ignition system including a spark gap or plug 530 is energized through a step-up transformer 532, an asynchronous vibrator 534 and a bimetal time delay relay 536. The bimetal time delay is located in the combustion chamber and senses the temperature there to de-energize the ignition system only when a proper predetermined temperature is reached.

A thermostat 538, which is normally open, closes as the burner continues to operate and maintains the fan motor 526 in operation, bypassing the contacts 522 and the diode 524. Finally, a load 540 is connected to the lines 316 and 317 to draw operating current from the battery whose cells are connected in series. The load 540 may actually be the various power-consuming controls and auxiliary equipment such as the blower motor for the hot-air furnace of FIG. 1.

Reverting to the function of the sensitive relay 326, it is connected to a trimming rheostat 331 and resistor network to control its operation in closing the contacts 324 only when the voltage from the diodes on the lines 302 and 304 reaches the value which indicates a fully charged cell. In one common type of cell, this is a voltage of 1.5 volts, but the proper voltage can be set for any cell, depending upon its charge voltage-time profile. A commercially available sensitive relay capable of accomplishing the purposes of this operation is sold under the trade name Sensitrol.

When the contacts 324 are so closed, they remain closed until action of the reset coil 322 opens them. A Zener diode 328 is placed in parallel with the sensitive relay 326 to prevent damage to the relay 326 should the full open circuit voltage of the three diodes 162 be placed temporarily across that relay.

With the cells of the battery 36 now all in parallel for charging, the cycle ends as the sensitive relay detects full voltage and closes the contacts 324. Now, the relay coil 328 is energized and its normally closed contact 522 is opened to cut off the flow of current through the solenoid gas valve 528 and gas ceases to flow into the combustion chamber. The fan 526 continues to operate to purge the system until the thermostat 538 opens in response to decreasing temperature at which time it is safe to stop the fan.

Now, the battery 34 is fully charged and in a standby condition. The battery 36 continues to power the load 540 until low voltage is again detected by the Zener diode 512. At this point, a new cycle begins, the battery 34 taking over the load and the battery 36 receiving a charge.

What is claimed is:

1. In combination with a heat-produced furnace having electrical power-consuming controls and auxiliary equipment, at least one thermionic diode for converting heat into electrical power, a source of heat for said thermionic diode, said diode converting a first portion of heat from said source into electrical power and rejecting a second portion of said heat, means for adding said second portion of said heat to that produced by said furnace and electrical connecting means for supplying electrical power from said thermionic diode to said power-consuming controls and to said auxiliary equipment.

2. In combination with a heat-producing furnace of the type defined in claim 1, the electrical connecting means which comprise an electrical power-storing system, means for charging a selected portion of said power-storing system from said thermionic diode upon predetermined depletion of said selected portion, and means for connecting said electrical power-consuming controls and said auxiliary equipment to the other portion of said electrical power-storing system which is not being charged by said thermionic diode.

3. In combination with a heat-producing furnace and electrical connecting means of the type defined in claim 2, the electrical power-storing system which comprises a plurality of battery cells, said selected portion comprising a first plurality of said cells connected in parallel circuit relationship and said other portion comprising a second plurality of said cells connected in series circuit relationship.

4. A thermionic power and heat source comprising a combustion chamber, a furnace for producing heat, an electrical load at least a part of which controls heat production by said furnace, at least one thermionic diode having an emitter and a collector and constituting a charging source, said emitter being mounted in said combustion chamber, means for introducing fuel to said combustion chamber for burning to heat said emitter, at least two storage batteries, means for selectively connecting either of said batteries upon predetermined depletion thereof separately to said source for charging, means for connecting the battery not being charged to said electrical load and means for conducting reject heat from said thermionic diode to said furnace to add to the heat produced by said furnace.

5. A thermionic power and heat source as defined in claim 4 wherein a plurality of said thermionic diodes are connected in series to provide charging of either of said batteries.

6. A thermionic power and heat source as defined in claim 4 wherein said furnace includes means for transferring heat to a building, and an inlet duct for receiving reject heat from said thermionic diode and further comprising means for adding said reject heat to said heat being transferred to said building.

7. A thermionic power and heat source as defined in claim 4 including a building to be heated by said furnace, means for circulating a heat-transmission medium from said furnace through said building, a line for returning said medium to said furnace, means for diverting a portion of said medium from said line to an area about said combustion chamber to extract heat therefrom and means for returning said portion from about said combustion chamber to said furnace.

8. A thermionic power and heat source as defined in claim 7 including a heat exchanger connected in operative relationship to said combustion chamber, means for passing products of combustion chamber through one side of said heat exchanger and means for passing said portion of said medium through the other side of said heat exchanger whereby heat from said products of combustion is transferred to said portion of said medium.

9. A thermionic power and heat source as defined in claim 8 wherein said heat exchanger comprises a heat-transfer wall between said one side and said other side, means for jetting said products of combustion upon one surface of said wall and means for jetting said portion of said medium upon the other surface of said wall.

10. A thermionic power and heat source as defined in claim 9 wherein said jetting means comprise a plurality of baffles having apertures formed therein disposed within and without said heat-transfer wall, said products of combustion being passed through certain of said apertures to impinge repeatedly upon said one surface and said portion of said medium being passed through other of said apertures to impinge repeatedly upon said other surface.

References Cited

UNITED STATES PATENTS

| | | |
|---|---|---|
| 2,362,259 | 11/1944 | Findley. |
| 3,150,657 | 9/1964 | Shultz et al. |
| 3,185,201 | 5/1965 | Herbst et al. |

JAMES W. WESTHAVER, Primary Examiner

U.S. Cl. X.R.

122—23; 165—105, 174; 310—4, 5